US012067956B2

(12) United States Patent
Kempf et al.

(10) Patent No.: US 12,067,956 B2
(45) Date of Patent: Aug. 20, 2024

(54) BIT PLANE DITHERING APPARATUS

(71) Applicant: TEXAS INSTRUMENTS INCORPORATED, Dallas, TX (US)

(72) Inventors: Jeffrey Matthew Kempf, Dallas, TX (US); Aravind Lakshminarayanan, Frisco, TX (US); Jonathan Lucas, Frisco, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 97 days.

(21) Appl. No.: 17/683,128

(22) Filed: Feb. 28, 2022

(65) Prior Publication Data

US 2023/0274719 A1 Aug. 31, 2023

(51) Int. Cl.
*G06T 1/60* (2006.01)
*G09G 5/02* (2006.01)

(52) U.S. Cl.
CPC ..... *G09G 5/022* (2013.01); *G09G 2320/0285* (2013.01); *G09G 2360/123* (2013.01)

(58) Field of Classification Search
CPC ....... G06T 1/20; G06T 2200/00; G06T 15/00; G06T 17/00; G06F 7/00
USPC .......................................................... 345/530
See application file for complete search history.

(56) References Cited

U.S. PATENT DOCUMENTS

| | | | | |
|---|---|---|---|---|
| 2002/0005913 A1* | 1/2002 | Morgan | G09G 3/20 | 348/739 |
| 2010/0295866 A1* | 11/2010 | Ishii | H04N 9/3123 | 345/597 |
| 2017/0280119 A1* | 9/2017 | Nicholson | H04N 9/3123 | |
| 2021/0003854 A1* | 1/2021 | Bartlett | G03H 1/32 | |
| 2021/0304365 A1* | 9/2021 | Bhattacharjee | G06T 5/008 | |

* cited by examiner

*Primary Examiner* — Gordon G Liu
(74) *Attorney, Agent, or Firm* — Michelle F. Murray; Frank D. Cimino

(57) ABSTRACT

A controller includes a frame memory configured to store an image frame, a frame memory controller coupled to the frame memory and configured to obtain image data from the image frame. The image data is associated with a color component of the image frame. The controller also includes a dither noise mask generator configured to provide dither noise masks according to dither noise levels for the image data, and a bit plane generator coupled to the frame memory controller and the dither noise mask generator and configured to generate bit planes based on the dither noise masks for the image data.

20 Claims, 5 Drawing Sheets

BIT PLANE DITHERING APPARATUS

BACKGROUND

Display systems project images onto surfaces, such as on a screen of the display system or an external surface, to display video or still pictures. Display systems include display devices such as cathode-ray tube (CRT) displays, liquid crystal displays (LCDs), and digital mirror device (DMD) displays, etc. A display device may include adjustable display elements, which are usually arranged in a matrix of rows and columns. The display elements form images with image location blocks, also referred to herein as pixels, on the screen or the surface where the image is projected. The display elements are adjusted by a controller to provide, based on color shades in the pixels of a displayed image, levels of brightness in the displayed image. The image data is also processed according to an image modulation scheme, such as pulse width modulation (PWM), to control the intensity and rate of the displayed images for proper viewing by a human eye.

SUMMARY

In accordance with at least one example of the disclosure, a controller includes a frame memory configured to store an image frame, a frame memory controller coupled to the frame memory and configured to obtain, from the image frame, image data associated with a color component of the image frame, a dither noise mask generator configured to provide dither noise masks according to dither noise levels for the image data, and a bit plane generator coupled to the frame memory controller and the dither noise mask generator and configured to generate bit planes based on the dither noise masks for the image data.

In accordance with at least one example of the disclosure, a system includes a controller configured to obtain, for an image frame stored in a frame memory, image data associated with a color component and to generate bit planes for dithered frames with a dither noise pattern, where the dithered frames include repeated bit sequences in the image frame; and a display device coupled to the controller and configured to display the image frame according to the bit planes with the dither noise pattern.

In accordance with at least one example of the disclosure, a method includes obtaining, by a frame memory controller, image data associated with one or more color components of an image frame from a frame memory, obtaining a dither noise level for the image data according to a transfer function, obtaining, according to the dither noise level, a dither noise pattern for the image data, generating, by a bit plane generator, bit plane data from the dither noise pattern, and loading, by a display formatter, the bit plane data including the dither noise pattern onto a buffer to send to a display device.

BRIEF DESCRIPTION OF THE DRAWINGS

For a detailed description of various examples, reference will now be made to the accompanying drawings.

DETAILED DESCRIPTION

Figure 1:
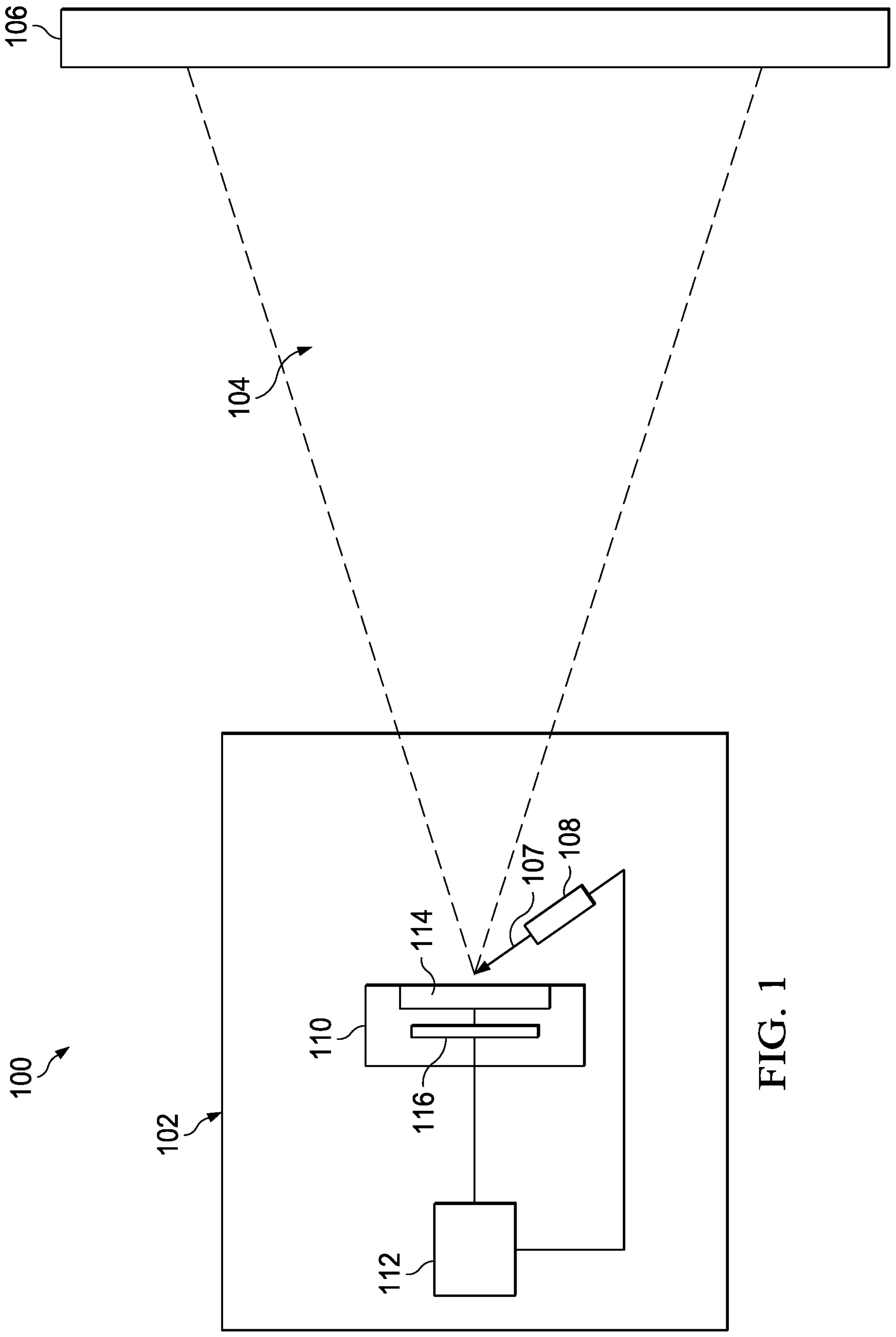
FIG. 1 is a block diagram of a display system, in accordance with various examples.

In display systems, image data is processed as digital data which includes bits that represent color shades in an image. Due to image processing, the displayed image may include groupings of uniform color shades in adjacent pixels of the image. The groupings of uniform color shades, also referred to herein as color contouring, can be viewed by the human eye as a sudden change in color shades from one region to another region of the image. This change may be less smooth than other variations in color shades across other regions of the image, which can reduce image quality and viewer experience.

To mitigate color contouring, a type of noise, referred to herein as dither noise, may be added to the image data during image processing. The process of adding dither noise to the image data is referred to herein as dithering. The dither noise introduces randomness in the digital data of the image, which can reduce the color contouring in the displayed image. An image frame is converted into a form of data, referred to herein as a bit plane, which is suitable for adjusting display elements of a display device to project the image. An image frame includes multiple pixels, which include multiple color components, such as red, green, and blue, that represent color shades of the image. A pixel of the displayed image is a projection of the pixel of the image frame in the image data. The color shades of the displayed pixel are the combined projection (e.g., over a time sequence) of the color components of the pixel. The color components of a pixel of an image frame may be represented by an equal number of bits on the display. One or more bit planes are obtained for each color component in the pixel of the image frame. A bit plane is generated by grouping bits with the same bit number from the group of pixels of the image frame. For example, if the pixels include eight bits for a certain color component, the first bits in the eight bits are collected for all the pixels and grouped to form a first bit plane for that color component. This process is repeated for each bit number to obtain eight bit planes for the same color component. Similarly, eight bit planes are formed for each color component. For example, if the pixels of an image frame are represented by three color components each represented by eight bits, the number of generated bit planes is equal to twenty four. A first bit plane is obtained by grouping the first bits of the first color component in the set of pixels, a second bit plane is obtained by grouping the second bits of the first color component, and the remaining bit planes are generated similarly for the remaining bits of the remaining color components in the set of pixels. In other examples, the pixels may include any m number of bits for a certain color component, and the number of bit planes may be equal to any n number of bit planes, where m and n are positive integers. For example, the n bit planes can be generated for the m bits of the color component using one or more m-to-n transfer functions.

The dither noise may be added to the bit planes of the image frame. Accordingly, dithering can be applied to the bit planes of a sequence of image frames before storing the bit planes in a memory. The stored bit planes of the image frames are processed and modulated, such as according to PWM, before displaying the processed image data. The processed and modulated bit frames are provided to a spatial light modulator (SLM), such as a DMD or a microscopic light-emitting diode (microLED), of a display device to project images on a screen or other surface. For example, with PWM, an SLM device can provide between 256 and 1024 uniformly distributed gray shades per color. To prevent color contouring, dithering may be applied to increase the number of gray shades to, in some examples, more than 65,535 gray shades. Increasing the number of gray shades is also referred to herein as increasing native bit depth of the PWM scheme. In examples, different PWM schemes can be used for different color channels, such as but not limited to for red (R), green (G) and blue (B).

The dither noise in the displayed images may be detectable by the human eye depending on spatial and temporal frequencies of the applied dither noise in the bit planes of an image plane. The spatial and temporal frequencies of the applied dither noise in the image frame is referred to herein as the dither rate. The spatial frequency of the dither noise is dependent on the rate of changing the location of the dither noise among the image frames or changing the dither noise among the pixels of an image frame. The temporal frequency of the dither noise is dependent on the rate of changing the dither noise over a time period for displaying the pixels of an image frame or for displaying consecutive image frames. Because dither noise is added to the bit planes of an image frame that is stored in the memory, the level of the dither noise in the respective displayed image is fixed during a time period for displaying the image. As such, the temporal frequency of the dither noise is limited by the frame rate in the sequence of displayed image frames.

This description describes various examples of a display system and method for removing the dependency of the dither rate on the frame rate. Removing this dependency allows increasing the dither rate in the displayed image frames to reduce the level of detectable dither noise by the human eye, also referred to herein as the perceptibility of the dither noise, in the displayed images. The dependency is removable by generating the bit planes including the dither noise after storing a sequence of image frames in the memory. During dithering and bit plane generation, the dither noise can be changed in bit sequences of pixels of the same image frame. Such bit sequences are referred to herein as dithered frames. The dithered frames are obtained from the image frame and processed to obtain bit planes including dither noise in real processing time without storing the bit planes in a memory. The bit planes are also generated during real processing time without storing bit plane data into the memory. Dithering can be applied according to the content of the frames and respective weights that determine display time according to PWM. To process the bit planes, a portion of the image frame can be read, at a time, into a buffer which may be a fraction in size of the bit plane. For example, the buffer can be limited to a size for swapping each dithered frame at a time.

Since the dithering and bit plane generation process is performed after reading the image frames into memory, the dithered frames can be generated in real time by reading data blocks from the image frame, calculating dither noise, and generating the bit planes including the dither noise. The data blocks processed for generating the bit planes, including the added dither noise, form the dithered frames, which are provided at a dither rate to the display device. This real time process can be performed on demand, also referred to herein as on-the-fly dithering and bit plane generation. Because the memory of the system stores image frames and not bit planes of the image frames, which can be larger in size than the image frames, the memory size in the display system can be reduced. The reduced memory size reduces the latency for displaying the image frames.

Because the dither noise added to the image data can be updated within the same displayed image frame, dithering can be applied at a rate higher than the frame rate for displaying image frames. Dithering is performed by updating the dither noise in the dithered frame in an image frame according to a dither rate higher than the frame rate to reduce the dither noise perceptibility in the displayed images. The dither noise pattern may be changed for the dithered frames based on different dither noise patterns. The dither rate of the dither noise can be determined according to the size of the dithered frame and the rate of changing the dither noise pattern.

FIG. 1 is a block diagram of a display system 100, in accordance with various examples. The display system 100 may display images or video by projecting image frames at a certain frame rate onto a screen or a surface. The display system 100 includes a display apparatus 102 configured to project a light 104 onto a projection display 106, such as a display screen or a wall screen. The projected light 104 is modulated by the display apparatus 102 to project still images or moving images (e.g., video) on the projection display 106. The display apparatus 102 includes one or more light sources 108, such as laser light sources or light emitting diodes (LEDs), for emitting light beams 107 at different color modes. A color mode is the visible color of a light beam 107 emitted by the light source 108, as perceived by the human eye in accordance with a wavelength, a wavelength range, or a combination of wavelengths of the emitted light. The projected light 104 is formed in relationship to the light beams 107. For example, the relationship between the projected light 104 and the light beams 107 can be temporal.

The display apparatus 102 also includes a display device 110 for projecting the light 104 onto the projection display 106, and a controller 112 for controlling various components of the display apparatus 102. The display device 110 includes a SLM 114 and a signal driving circuit 116. The SLM 114 may be a micro-electromechanical system (MEMS) device that includes optical elements (not shown), such as micromirrors, which have adjustable movements for directing by reflection, modulating, and combining the light beams 107 from the one or more light sources 108 into the projected light 104. In other examples, the optical elements of the SLM 114 may be microscopic light-emitting sources (not shown) instead of the light sources 108, such as microscopic light-emitting diodes (LEDs) which have adjustable light emission to modulate and provide the light projected light 104. For example, the SLM 114 may be a DMD, a phase light modulator (PLM), a microLED, or any other device with optical elements for manipulating light beams to form and display an image. The optical elements form respective pixels of the displayed image on the projection display 106. The optical elements of the SLM 114 are adjusted by signals from the signal driving circuit 116 based on image data. For example, the signals carry the image data that represent modulated image frames according to PWM. The signals adjust the optical elements of the SLM 114 to modulate the light beams 107, shape the projected light 104, and form the image onto the projection display 106. The controller 112 processes and sends the image data, which includes digital data that represent modulated image frames, to the signal driving circuit 116 to adjust the optical elements of the SLM 114. The controller 112 may include one or more processors and memory components (neither explicitly shown in FIG. 1) for storing executable instructions to program the controller 112 to process the image data.

Figure 2:
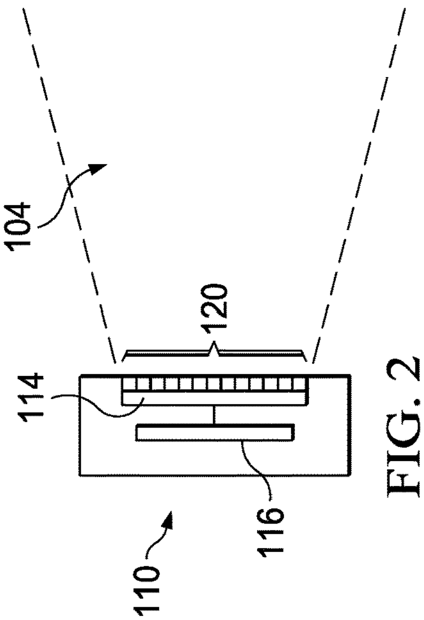
FIG. 2 is a block diagram of a display device of the display system, in accordance with various examples.

FIG. 2 is a block diagram of the display device 110, in accordance with various examples. The SLM 114 of the display 110 includes optical elements 120 that form a grid, such as a two dimensional grid, of pixels on the surface of the SLM 114. As described above, the SLM 114 of the display device 110 may be a MEMS device, such as a DMD or PLM. For example, the optical elements 120 may include micromirrors that reflect the light beams 107 from the one or more light sources 108 into the projected light 104. In other examples, instead of the light sources 108, the SLM 114 may be a microLED including light emitting sources. In this SLM 114, the optical elements 120 include microscopic LEDs as light sources, such as InGaN based microscopic LEDs arranged in an array. The microscopic LEDs emit light at different color modes to form the projected light 104. The projected light 104 forms images on the projection display 106. The signal driving circuit 116 of the display device 110 provides signals, based on image data, for PWM to the optical elements 120. The signals modulate the light emission by the optical elements 120 to shape the projected light 104 and form an image, according to the image data, onto the projection display 106. For example, if the SLM 114 is a microLED, the signals modulate the light emission by the microscopic LEDs. The image data is processed and sent by the controller 112 to the signal driving circuit 116. The controller 112 may also send data to the signal driving circuit 116 to determine the PWM.

Figure 3:
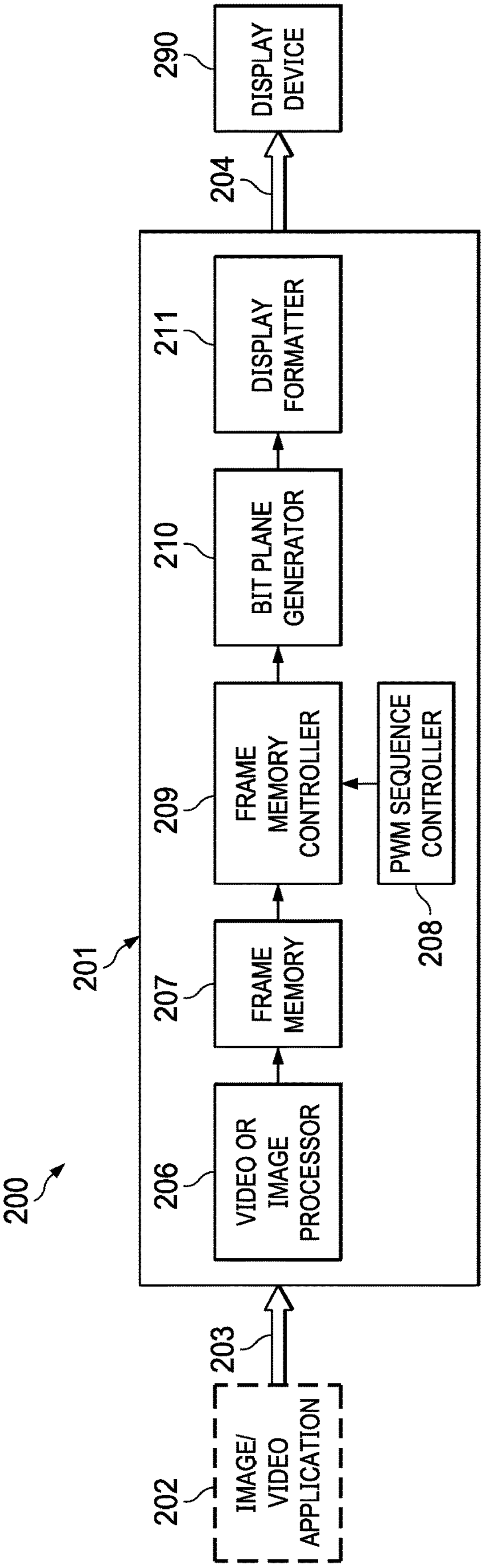
FIG. 3 is a block diagram of an image processing system, in accordance with various examples.

FIG. 3 is a block diagram of an image processing system 200, in accordance with various examples. The image processing system 200 is configured to process image data including image frames for displaying respective images. The image processing system 200 may be part of the display system 100. The image processing system 200 includes an image display controller 201 configured to receive image data from an image or video application 202 in the form of image or video signals 203 and process the image data to provide processed image data. The image display controller 201 sends the processed image data in the form of voltage signals 204 to the display device 290 for displaying respective images. For example, the image display controller 201 may be part of the controller 112 and the display device 290 is an example of the display device 110.

The image data includes digital data that represent images encoded according to a suitable image or video encoding standard. The image or video signals 203 may be any signal received on a physical interface for transferring image data, such as a high-definition multimedia interface (HDMI) interface, a display serial interface (DSI) interface, a flat panel display (FPD) interface, a parallel red, green and blue (RGB) interface, or other suitable interfaces for transferring image data. After processing the image data, the image display controller 201 may send the voltage signals 204 carrying the processed image data to the display device 290. For example, the voltage signal 204 is a voltage signal provided according to a low voltage differential signaling (LVDS), a reduced LVDS (Sub-LVDS), a parallel pixel (I/F) signal, or any suitable voltage signal for displaying images by the display device 290.

The image display controller 201 includes a video or image processor 206, a frame memory 207, a PWM sequence controller 208, a frame memory controller 209, a bit plane generator 210, and a display formatter 211. The components of the image display controller 201 may be implemented via hardware, software, or combinations thereof. One or more of the components of the image display controller 201 may also be combined into a single integrated component. The video or image processor 206 converts the image or video signals 203 into the image data. The image data may be digital data arranged in a time sequence of image frames. The video or image processor 206 compresses the image data into digital data of multiple image frames. The video or image processor 206 sends a sequence of the image frames to the frame memory 207 which stores the image frames. The image frames may be processed and stored at a certain frame rate according to the time sequence of image frames.

The frame memory controller 209 processes pixels of the stored image frames from the frame memory 207 and modulate the pixels or the image frames according to a pulse wave signal from the PWM sequence controller 208. The PWM sequence controller 208 may send the pulse wave signal to control the modulation according to certain PWM parameters. At the bit plane generator 210, the bit planes are generated per image frame to which the updated dither noise patterns are provided. The bit plane generator 210 also processes the dither noise for the pixels of the image frames according to certain dither rate for the dither noise. The color components of the pixel may be divided into smaller bit sequences for updating the dither noise. A dither noise pattern may be updated per bit sequence of the color components of the pixels. Accordingly, the bit planes of an image frame are provided with different dither noise patterns at a higher rate than the frame rate. After dithering and bit plane generation, the bit plane generator 210 sends the bit planes to the display formatter 211 which converts the bit planes into a signal format, such as voltage signals, suitable for controlling the display device 290. The display formatter 211 may buffer a portion of the bit plane, at a time, for processing the bit plane. For example, the signal format includes voltage values for adjusting the optical elements of the SLM 114 in the display device 290. The image data is sent to the display device 290 in the form of the voltage signals 204.

Figure 4:
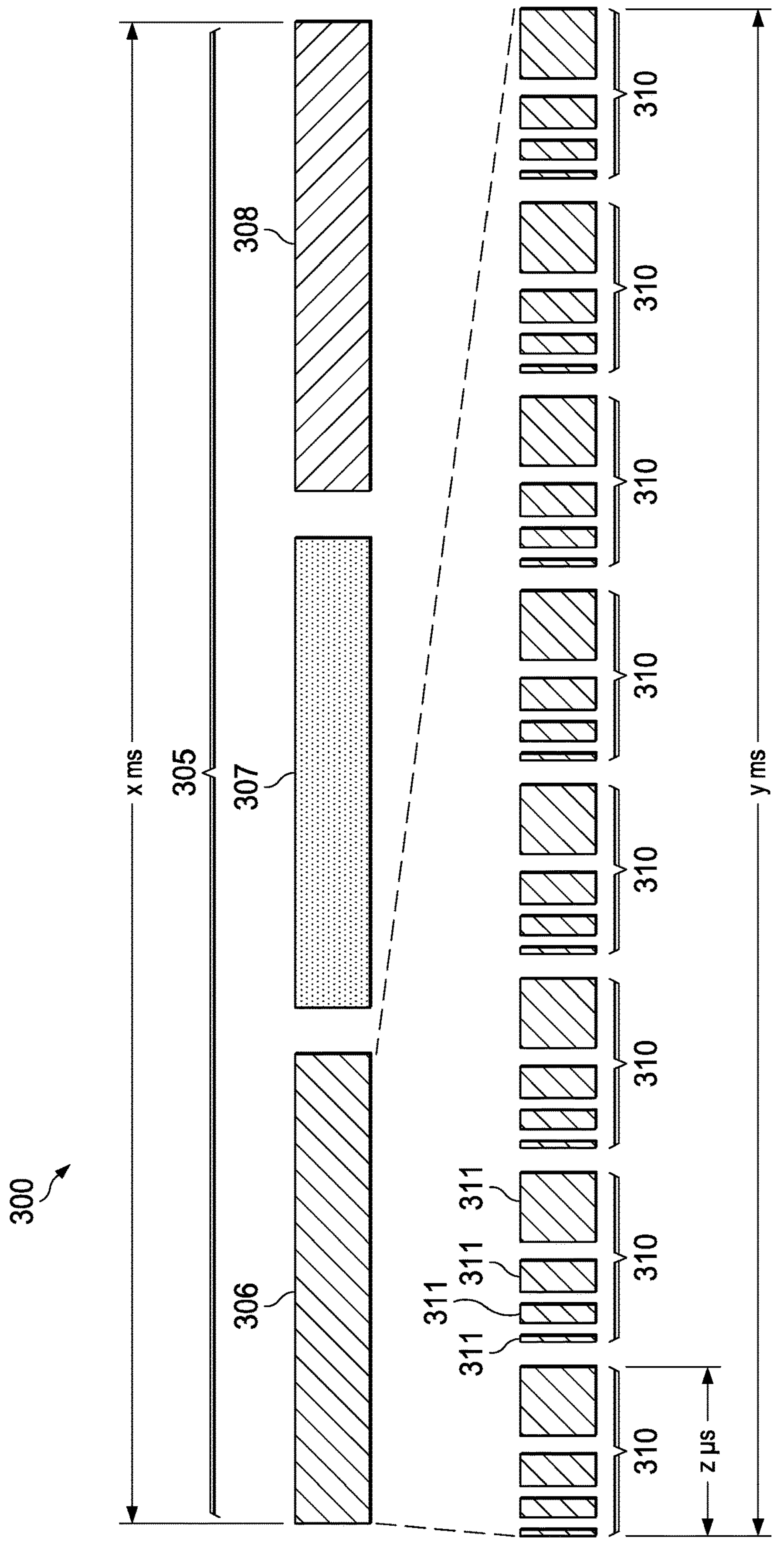
FIG. 4 is a block diagram of bit sequences for a pixel of an image frame, in accordance with various examples.

FIG. 4 shows bit sequences 300 for a pixel 305 of an image frame, in accordance with various examples. The bit sequences 300 of the image frame are processed by the image display controller 201 to obtain bit planes including dither noise for the image frame. For example, the image frame is obtained by the frame memory controller 209 from the frame memory 207. The dithering and bit planes may be provided by the bit plane generator 210. The pixel 305 may be one of multiple pixels (not shown) that form the image frame. The pixels of the image frame may include similar sequences, which are processed similarly. The content per bit plane varies across the pixels based on the image frame data. The pixel 305 includes a certain number of bits, also referred to herein as a bit size. The pixel 305 includes a first color component 306, a second color component 307, and a third color component 308, which may have equal or different bit sizes. For example, the pixel 305 includes red, green, and blue color components of equal or different bit sizes. The first, second and third color components 306, 307, and 308 represent respective color shades for displaying a pixel in a projected image associated with the image frame. The color shades are provided by pixels values in the image frame. According to the frame rate, the pixel 305 is displayed for a certain time period, such as for x milliseconds (ms), where x is a positive number. During this time period, the first, second and third color components 306, 307, and 308 are displayed for a respective time period, such as for y ms, where y is a positive number. For example, the time period for displaying the pixel 305 may be equal to approximately 16.67 ms, which corresponds to the frame rate for displaying image frames. During this period, the first, second and third color components 306, 307, and 308 are displayed in a certain order for the time period of y ms. For example, the first color component 306 may be displayed for approximately 5.56 ms which is about one third of the time period for displaying the pixel 305 or one third of the frame rate.

The bit sequences 300 include repeated instances of dithered frames 310 of the first, second and third color components 306, 307 and 308. The dithered frames 310 may be provided by the bit plane generator 210. As shown in FIG. 4, the first color component 306 may include dithered frames 310 of equal time periods, such as for z ms, where z is a positive number. A dithered frame 310 includes a sequence of bits 311 and may be displayed a certain number of times based on the time period for displaying the first color component 306. For example, in the repeated instances of dithered frames, a dithered frame 310 is displayed each time for approximately 695 microseconds (us). Accordingly, the dithered frame 310 is displayed eight times during the approximately 5.56 ms time period for displaying the first color component 306. The bit size of the dithered frame 310 and the number of times the dithered frame is displayed depend on the bit size of the first color component 306. For example, the bit size of the dithered frame 310 is four bits and the bit size of the first color component 306 is 32 bits. The bits 311 of the dithered frame 310 may be displayed one at a time with different time periods according to PWM. For example, a first bit 311 of the of the dithered frame 310 is displayed for a first time period. The second bit 311 of the dithered frame 310 is displayed for a second time period that is longer than the first time period of the first bit, such as twice the time period of the first bit. The remaining bits 311 of the dithered frame 310 are also displayed for longer respective time periods. The third bit 311 of the dithered frame 310 is also displayed for twice the second time period of the second bit, and the fourth bit 311 of the dithered frame 310 is displayed for twice the third time period of the third bit. The time for displaying the bits 311 can be provided by weighting the pixel values according to a transfer function for PWM.

Similarly, dithered frames of the second and third color components 307 and 308 may be displayed recurrently based on the time periods for displaying the second and third color components 307 and 308. In examples, the dithered frames of the second and third color components 307 and 308 are displayed for approximately the same time duration as the dithered frame 310 and are displayed the same number of times as the dithered frame 310. In other examples, the first, second and third color components 306, 307 and 308 of the image frame are displayed with different time periods. Accordingly, the dithered frames of the first, second and third color components 306, 307 and 308 have different display time periods and are displayed different numbers of times.

Figure 5:
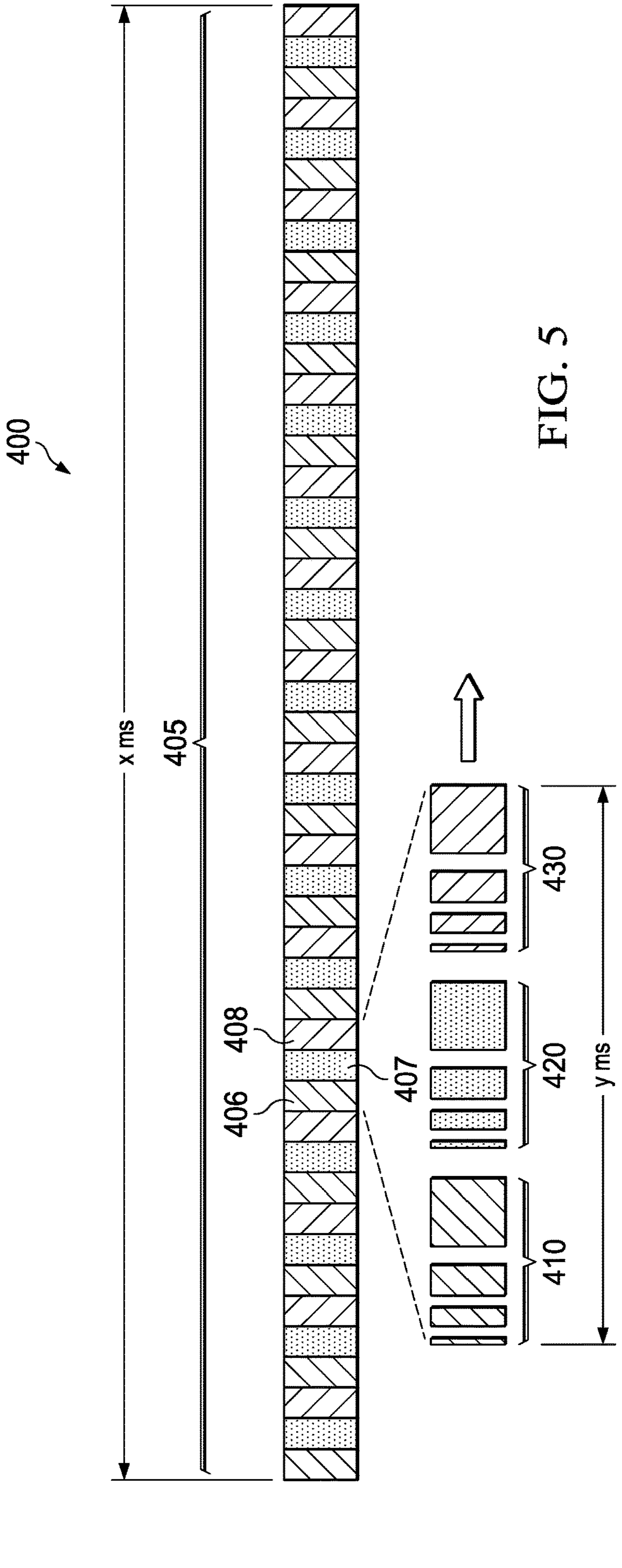
FIG. 5 is a block diagram of bit sequences of a color interleaved pixel of an image frame, in accordance with various examples.

FIG. 5 is a block diagram of bit sequences 400 of a color interleaved pixel 405 of an image frame, in accordance with various examples. The bit sequences 400 of the color interleaved pixel 405 are processed by the image display controller 201 for dithering and bit plane generation. A color interleaved pixel 405 includes repeated instances of a first color component 406, a second color component 407, and a third color component 408, which may have equal or different bit sizes. For example, the first, second and third color components 406, 407, and 408 may be red, green, and blue color components, respectively. For example, the image frame is obtained by the frame memory controller 209 from the frame memory 207. The dithering and bit planes may be provided by the bit plane generator 210. According to the frame rate, the bit sequences 400 of the color interleaved pixel 405 is displayed for a certain time period, such as for x ms. The repeated instances of the first, second and third color components 406, 407, and 408 may be each displayed for an equal time period, such as for y ms. For example, the time period for displaying the bit sequences 400 of the color interleaved pixel 405 are equal to approximately 16.67 ms, which corresponds to the frame rate for displaying image frames. During this period, the first, second and third color components 406, 407, and 408 are displayed in repeated instances with a repeated time period of approximately 1 ms.

In the color interleaved pixel 405, the first, second and third color components 406, 407, and 408 may include equal or different numbers of bits that are repeated at each instance of displaying the first, second and third color components 406, 407, and 408. The repeated first color component 406 includes a first dithered frame 410, the repeated second color component 407 includes a second dithered frame 420, and the repeated third color component 408 includes a third dithered frame 430. For example, the first, second, and third dithered frames 410, 420 and 430 have equal bit sizes of four bits. The bits of the first, second and third dithered frames 410, 420 and 430 may be displayed one at a time with different time periods. The first, second, and third dithered frames 410, 420, and 430 may be provided by the bit plane generator 210. For example, a first bit of the first, second or third dithered frames 410, 420 and 430 are displayed for a first time period. The second bit of the first, second or third dithered frames 410, 420 and 430 are displayed for a second time period that is twice the time period of the first bit. The third bit of the first, second or third dithered frames 410, 420 and 430 are displayed for twice the second time period of the second bit, and the fourth bit of the first, second or third dithered frames 410, 420 and 430 are displayed for twice the third time period of the third bit.

Bit plane generation and dithering may be applied for each instance of a dithered frame of the image frame. For example, bit planes are generated at the bit plane generator 210 for the dithered frames 310, or the first, second, or third bit dithered frames 410, 420 and 430. A bit plane corresponding to a bit number of the dithered frame is obtained by grouping the same respective bits of the dithered frames for the pixels that form the image frame. A first bit plane is obtained by grouping the first bits of the dithered frame in the set of pixels of the image frame. A second bit plane is obtained by grouping the second bits of the dithered frame in the set of pixels. The remaining bit planes are generated similarly for the remaining bits of the dithered frame in the set of pixels of the image frame until a group of bit planes is obtained for the respective bits in the dithered frame. For example, if the dithered frame includes four bits, the number of generated bit planes are equal to four. Bit planes are obtained for a dithered frame including dither noise according to a dither noise pattern. The dither noise pattern may be updated for each dithered frame. Accordingly, the bit planes for different dithered frames include different dither noise patterns. Different dither noise patterns may be applied to dithered frames of different color components or PWM weights.

The dither rate of the dither noise is determined by the rate of change in the dither noise pattern between dithered frames. Since the dithered frame is repeated within an image frame, the dither rate is higher than the frame rate and may be obtained by determining the bit size of the dithered frame with respect to the bit size of the image frame. For example, a dithered frame repeated in a time period of approximately 695 us provides a dither rate of approximately 1.4 kilohertz (kHz). Accordingly, the dither rate is increased by reducing the bit size of the dithered frame to reduce dither noise perceptibility in the displayed image. For example, doubling the dither rate may reduce the dither noise perceptibility by approximately 50 percent. The dither noise pattern may also be determined to reduce the dither noise perceptibility. For example, a dither noise pattern based on blue noise is less perceivable with respect to other dither noise functions. Blue noise provides a noise pattern with blue color frequency levels, which may be higher than the frame rate and reduce the perceptibility of the dither noise in the displayed images.

Figure 6:
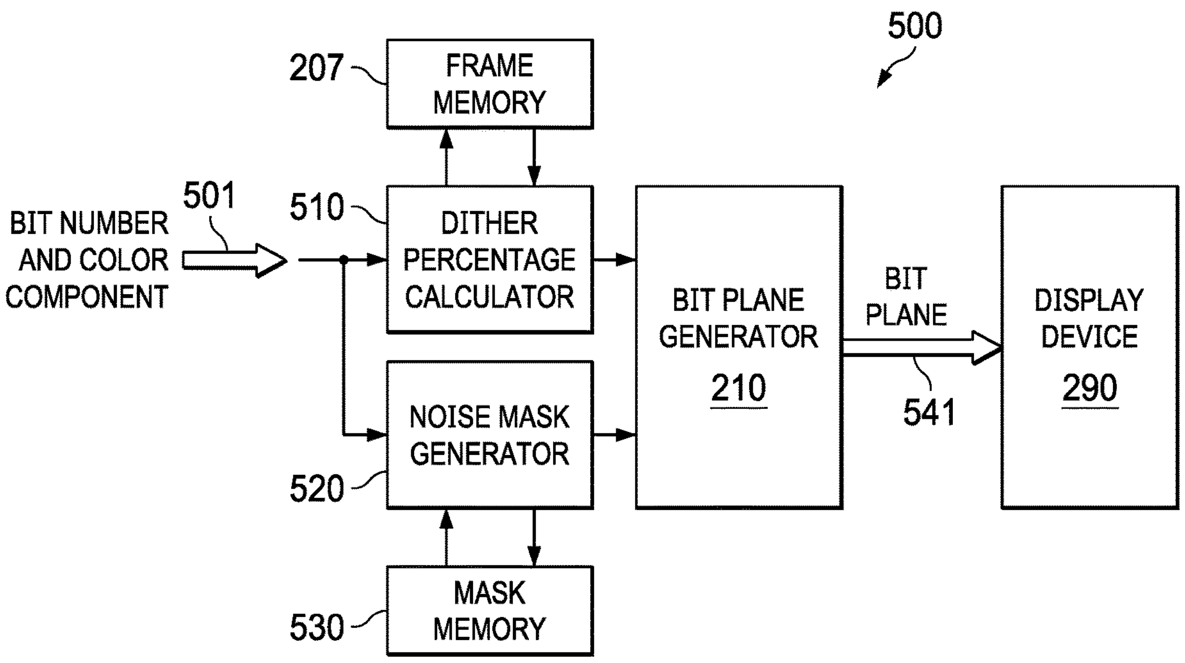
FIG. 6 is a block diagram of a bit plane dithering system, in accordance with various examples.

FIG. 6 is a block diagram of a bit plane dithering system 500, in accordance with various examples. The bit plane dithering system 500 may be part of the image processing system 200. The bit plane dithering system 500 is configured to provide dither noise for dithered frames in an image frame, which is obtained from the frame memory 207. The bit plane dithering system 500 includes a dither percentage calculator 510, a noise mask generator 520, and a mask memory 530. For example, the dither percentage calculator 510, the noise mask generator 520, and the mask memory 530 may be components of the frame memory controller 209.

The dither percentage calculator 510 can obtain on-the-fly dither noise levels for the dithered frames in an image frame based on certain transfer functions, which may be provided via stored look-up tables (LUTs). In examples, the dithered noise levels can be obtained, in real processing time and on demand, for observation blocks that form the image frame. For example, a 16-bit dither percentage can be calculated for each 10-bit input palette value. The image processing system 200 may store available LUTs, such as 32 LUTs, that specify the relationship between a 10-bit input value and a 16-bit dither percentage. Accordingly, 32 unique bit plane weights can be provided. A bit plane translation LUT may also be stored to determine which of the available LUTs to select. Accordingly, a bit plane dither LUT, a current displayed color, and whether to obtain a blue noise mask by an available LUT can be determined. An input palette value is selected based on the current displayed color. The 10-bit input is translated to the 16-bit dither percentage based on the selected bit plane dither LUT.

The noise mask generator 520 can obtain on-the-fly dither noise masks based on the dither noise levels for the dithered frames. The noise mask generator 520 can provide, in real processing time and on demand, one or more dither noise masks for a dithered frame according to LUTs for dither mask generation. The LUTs for generating dither noise masks may be stored at the mask memory 530. The noise mask generator 520 can also retrieve a previously stored dither noise mask from the mask memory 530. The dither noise masks from the noise mask generator 520 can be combined at the bit plane generator 210 to provide bit planes including dither noise on-the-fly. The bit planes are sent to the display device 290 for displaying an image based on the processed image frame.

For example, a 256×256×16 bit dither matrix can be generated, in a two-part process, for a 16-bit pixel dither percentage. First, a 32×32×10 bit mask is obtained with an 8×8×6 bit mask. For example, a most significant bit (MSB) mask and a least significant bit (MSB) mask can be selected based on six 10-bit temporal counters, one per color, for a bit plane. A counter is incremented for each color. Upon reset, these counters are set to the appropriate reset register value. A linear-feedback shift register (LFSR) can be set for generating each random row and random column of the dither matrix. For example, the LFSR can be a 27-bit LFSR. The LFSR is first reset to a value and is incremented on each change of a temporal count for a respective color. A 32×32×10 bit LSB mask can be generated from a corresponding dither atom LUT and a current temporal count. This step includes generating the mask based on the color count of the current bit plane, determining the current spatial index and temporal index, looking up the spatial-temporal index, modifying the spatial address if random movement is enabled, and writing to the respective mask entry. A 8×8×6 bit MSB mask can be generated similarly from a corresponding dither atom LUT and a current temporal count. The current 32×32×10 bit MSB mask can be replicated to cover the entire display. For example, if the input is 1920 pixels by 1080 lines, MSB mask is copied 60 times horizontally and 34 times vertically. Each entry in the current 8×8×6 bit LSB mask can also be replicated 32 times horizontally and 32 times vertically to form a 256×256 matrix. For example, if the upper left entry of a 8×8 LSB LUT is 5, then the first 32 columns and 32 rows of the calculated 256×256 matrix may contain a 5. This 256×256 matrix can be replicated across the entire display. The resulting two matrices are combined to form a 16-bit dither threshold. The 32×32 calculated mask can be selected for the upper 10-bits, and the 8×8 calculated mask can be selected for the lower 6-bits. In this example, if quantization is enabled, the dither threshold values may be forced to 32768, which translates to 50 percent and forces rounding to the nearest value.

In the image processing system 200 and the bit plane dithering system 500, one bit plane may be processed at a time during dithering and bit plane generation and dithering. A bit plane may be held in a memory buffer during this one-the-fly process, such as in the display formatter 211, and then replaced by a next bit plane of the dithered frame. The dither noise mask for the dithered frame may be read into a buffer of the frame memory controller 209.

Since dithering and bit plane generation are performed after storing image frames in the frame memory 207, the bit planes for a dithered frame are generated and processed including dither noise without storing the bit planes in the frame memory 207. For example, a bit stream of image data which represents a sequence of image frames is received from the image or video application 202 and stored in the frame memory 207. At any time after storing the image frames, the dither noise masks and the bit planes can be generated and processed to provide the display device 290 with signals at certain frame and dither rates. In examples, the dither rate can be on the order of 1 kHz or more irrespective of the image frame rate. During dithering and bit plane generation, the bit sequences for processing each bit plane are obtained from the frame memory 207. Accordingly, the image or video application 202 can be switched off to a lower power mode prior to or during dithering and the bit plane generation, which reduces power consumption in the display system 100.

In examples, the dither rate may also be determined to reduce undesirable artifacts that may be introduced by the PWM sequence controller 208 to the image frames, such as PWM visible or strongly perceived boundaries among the image frames. The dither rate may also be adjusted to remove or reduce undesirable artifacts in displayed image frames, such as for images captured by a camera that includes DMD for SLM, or other digital camera devices. This can be useful for motion rendition. In the case of motion tracking or rendering applications, image frames may be displayed according to time periods based on the dither rate to reduce undesirable artifacts added by processing the image frames in such applications. For example, in head tracking applications, such as for camera enabled smartphones, an image can be shifted on a time period basis according to the dither rate to provide motion compensation. The dither rate may also be increased to support the processing of image frames with higher rates, such as for three-dimensional (3D) images, or image frames with higher color sequential rates. The dithered frames with a higher rate and a smaller bit size, and accordingly less bit depth, than the image frames can match the image frame perceptibility. For example, a frame with a 1-bit sequence that is updated at 15 kHz is approximately equal to a frame with 8-bit sequence updated at 60 Hz. The dithering and bit plane generation also allows high color cycle rates for MSBs and for other bits in the image data.

Figure 7:
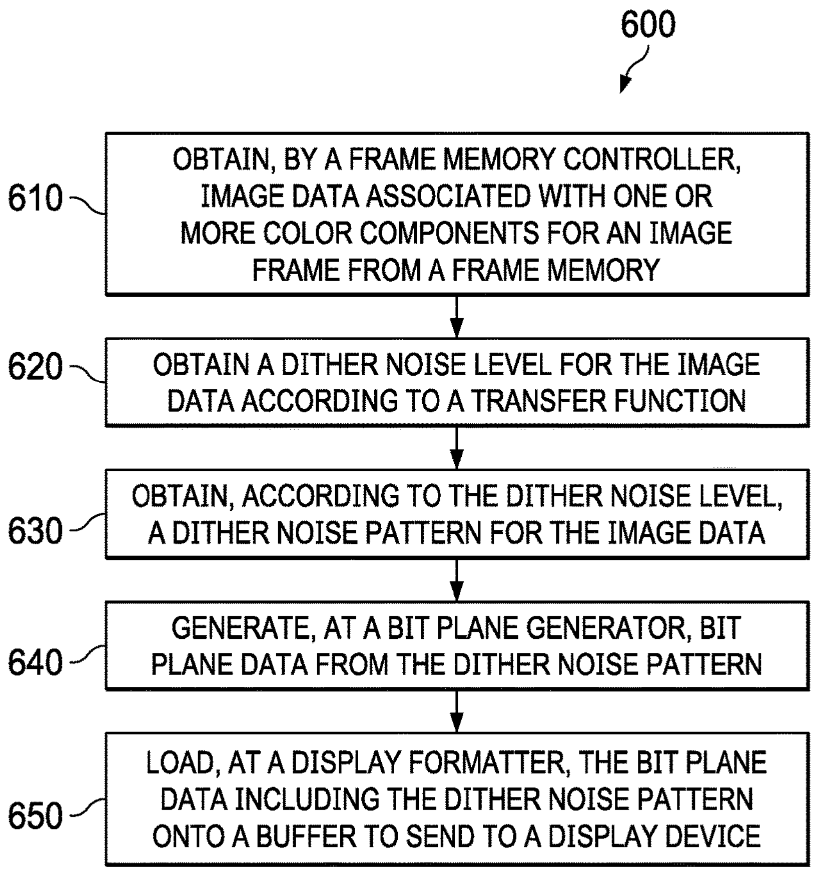
FIG. 7 is a flow diagram of a method for bit plane dithering, in accordance with various examples.

FIG. 7 is a flow diagram of a method 600 for bit plane dithering, in accordance with various examples. For example, the method 600 may be part of an on-the-fly process performed by the image processing system 200 in real time and on demand. At step 610, a frame memory controller obtains image data associated with one or more color components for an image frame from a frame memory. The one or more color components represent a color shade of the image data. For example, the frame memory controller 209 obtains the first color component 306 in the pixels 305 of an image frame in a sequence of image frames from the frame memory 207.

At step 620, a dither noise level is obtained for the image data according to a transfer function. For example, the dither noise level can be calculated by the dither percentage calculator 510. The dither noise level can be obtained for each one of multiple observation blocks that form the image data. For example, the image data may be represented by a two-dimensional matrix of bits, which can be divided into smaller two-dimensional observation blocks of bits, such as 4×4, 8×8, or 16×16 blocks of bits, each including a pixel value. The image noise level can be obtained based on a LUT that stores dither noise levels in respective table entries that correspond to pixel values. The LUT provides the transfer function for obtaining the dither noise level according to the image data, such as according to pixel values in the image data. The dither noise level is obtained from the LUT entry that corresponds to the pixel value in the observation block. For example, if the pixel value in the observation block from the image data is equal to 50, the dither noise level that is stored in the $51^{st}$ entry in the LUT is obtained.

At step 630, a dither noise pattern is obtained according to the dither noise level. For example, the noise mask generator 520 generates, or obtains from the mask memory 530, one or more dither noise masks providing the dither noise pattern for the first color component 306. The dither noise pattern can be determined according to the dither noise level for each observation block. For example, the dither noise pattern for a dither noise level of approximately half the maximum pixel value can be represented by a two-dimensional dither noise mask with approximately half of the bits set to one and the remaining bits set to zero. Examples of dither noise masks include blue noise dither masks that provide blue noise. The dither noise masks can be applied in respective dithered frames at a dither rate higher than the frame rate. The dither noise masks can also be obtained based on LUTs, which may include LUTs for providing spatial and temporal dither noise frequencies.

In examples, prior to obtaining the dither noise level or the dither noise pattern according to respective LUTs, the image data can be weighted for PWM via another LUT configured to provide weighted values that determine the time for displaying the bits in the image data according to PWM. The dither noise level and the dither noise pattern LUTs may be selected from a plurality of available LUTs according to the weighted image data for PWM and/or color shades of the image data.

At step 640, a bit plane generator generates bit plane data from the dither noise pattern. For example, a bit plane can be generated by combining the dither noise masks for respective observation blocks which form the image data. The bit plane data can be generated without storing the bit plane data in the frame memory. The bit plane data include bit planes for the dithered frames. For example, the bit plane generator 210 generates bit planes for the dithered frames 310 of the first color component 306 in the pixels 305.

At step 650, the bit plane data including the dither noise pattern are loaded onto a buffer, at a display formatter, to send to a display device for displaying an image. For example, the display formatter 211 of the image display controller 201 buffers and sends the bit planes of the first color component 306 in the form of voltage signals 204 to the display device 290.

The term "couple" appears throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A system or device that is described herein as including certain components may instead be adapted to be coupled to those components to form the described system or device.

While certain components may be described herein as being of a particular process technology, these components may be exchanged for components of other process technologies. Systems and devices described herein are reconfigurable to include the replaced components to provide functionality at least partially similar to functionality available prior to the component replacement.

Unless otherwise stated, "about," "approximately," or "substantially" preceding a value means +/−10 percent of the stated value. Modifications are possible in the described examples, and other examples are possible within the scope of the claims.

The invention claimed is:

1. A controller, comprising:

a frame memory configured to store an image frame;

a frame memory controller coupled to the frame memory, the frame memory controller configured to obtain image data from the image frame, the image data associated with a color component of the image frame;

a dither noise mask generator configured to provide a dither noise mask according to a dither noise level for the image data;

a dither percentage calculator coupled to the frame memory controller, the dither percentage calculator configured to produce a dither noise level based on the image data; and a bit plane generator coupled to the frame memory controller, to the dither percentage calculator, and to the dither noise mask generator, the bit plane generator configured to produce dithered bit planes based on the dither noise mask and the dither noise level.

2. The controller of claim 1, wherein the dither percentage calculator is further configured to provide the dither noise level for the image data according to a transfer function.

3. The controller of claim 1, wherein the bit plane generator is configured to provide, to a display device, the dithered bit planes including a dither noise pattern according to the dither noise mask.

4. The controller of claim 3, further comprising a memory buffer configured to buffer the dithered bit planes.

5. The controller of claim 3, further comprising a display formatter coupled to the bit plane generator, the display formatter configured to convert the dithered bit planes into a voltage signal for instructing the display device to display the image frame.

6. The controller of claim 1, wherein the bit plane generator is configured to provide bit planes for dithered frames at a dither rate based on a number of bits in repeated bit sequences of the dithered frames, and wherein the image frame is displayed in a sequence of image frames at a frame rate that is slower than the dither rate.

7. The controller of claim 6, wherein the dither rate is determined to provide spatial and temporal frequencies for a dither noise pattern in the image frame that reduce color contouring and dither noise perceptibility in the displayed image frame.

8. The controller of claim 6, wherein the displayed image frame includes repeated dithered frames for different color components in color interleaved pixels of the image frame.

9. The controller of claim 6, wherein the displayed image frame includes repeated dithered frames for a same color component in pixels of the image frame.

10. A system, comprising:

a controller configured to:

obtain, for an image frame stored in a frame memory image, data associated with a color component; and generate dithered bit planes having a dither noise pattern, the dithered bit planes including time repeated bit plane sequences in the image frame; and a display device coupled to the controller, the display device configured to display the image frame according to the dithered bit planes.

11. The system of claim 10, wherein the display device comprises:

a spatial light modulator (SLM) configured to project an image of the image frame according to the dithered bit planes; and a light source optically coupled to the SLM, the light source configured to provide light for projecting the image, the light having multiple wavelengths that provide color modes to display the image frame.

12. The system of claim 10, wherein the display device includes a digital mirror device (DMD), a phase light modulator (PLM), or a microscopic light emitting diode (microLED).

13. A method, comprising:

obtaining, by a frame memory controller, image data associated with one or more color components of an image frame, from a frame memory;

determining a dither noise level for the image data based on the image data and a transfer function, wherein the dither noise level is represented by a first number of bits, the image data is represented by a second number of bits, and the second number of bits is different than the first number of bits;

determining, based on the dither noise level, a dither noise pattern for the image data;

generating, by a bit plane generator, bit plane data based on the dither noise pattern; and loading, by a display formatter, the bit plane data onto a buffer to send to a display device.

14. The method of claim 13, wherein the image data is divided into blocks of bits, wherein the dither noise level and one or more dither noise masks are obtained for each block, and wherein the bit plane data is determined by combining the dither noise masks for the blocks.

15. The method of claim 14, wherein the dither noise pattern is represented by one or more dither noise masks for each block, wherein each dither noise mask is provided by a look-up table (LUT).

16. The method of claim 15, wherein the one or more dither noise masks include a blue noise pattern having blue color spatial or temporal frequencies.

17. The method of claim 13, wherein the transfer function is provided by a look-up table (LUT), and wherein the dither noise level is obtained from the LUT according to a pixel value in the image data.

18. The method of claim 13, further comprising weighting the image data for pulse width modulation (PWM) to provide a time for displaying bits in the image data.

19. The method of claim 18, wherein the image data is weighted by a look-up table (LUT) prior to determining the dither noise level or the dither noise pattern.

20. The method of claim 19, further comprising determining the dither noise level or the dither noise pattern by a respective LUT selected from a group of LUTs according to the weighted image data for PWM or color shades of the image data.

* * * * *